(12) United States Patent
Fullerton et al.

(10) Patent No.: US 7,027,425 B1
(45) Date of Patent: Apr. 11, 2006

(54) IMPULSE RADIO VIRTUAL WIRELESS LOCAL AREA NETWORK SYSTEM AND METHOD

(75) Inventors: Larry W. Fullerton, Brownsboro, AL (US); James S. Finn, Huntsville, AL (US)

(73) Assignee: Alereon, Inc., Austin, TX (US)

( * ) Notice: Subject to any disclaimer, the term of this patent is extended or adjusted under 35 U.S.C. 154(b) by 0 days.

(21) Appl. No.: 09/501,372

(22) Filed: Feb. 11, 2000

(51) Int. Cl.
*H04Q 7/24* (2006.01)

(52) U.S. Cl. .................. 370/338; 370/392; 370/395.1; 370/401; 370/437; 713/153; 713/155; 713/160; 713/162

(58) Field of Classification Search ............. 870/310.1, 870/310.2, 328, 331, 338, 395.1, 395.2, 395.3, 870/397, 389, 392, 431, 437; 713/153, 154, 713/155, 160, 162, 201
See application file for complete search history.

(56) References Cited

U.S. PATENT DOCUMENTS

| | | | | |
|---|---|---|---|---|
| 4,641,317 A | | 2/1987 | Fullerton | 375/1 |
| 4,813,057 A | | 3/1989 | Fullerton | 375/37 |
| 4,979,186 A | | 12/1990 | Fullerton | 375/23 |
| 5,237,320 A | * | 8/1993 | Sato et al. | 340/7.28 |
| 5,363,108 A | | 11/1994 | Fullerton | 342/27 |
| 5,572,528 A | * | 11/1996 | Shuen | 370/402 |
| 5,677,927 A | | 10/1997 | Fullerton et al. | 375/200 |
| 5,687,169 A | | 11/1997 | Fullerton | 370/324 |
| 5,832,035 A | | 11/1998 | Fullerton | 375/210 |
| 6,009,088 A | * | 12/1999 | Taguchi et al. | 370/338 |
| 6,069,883 A | * | 5/2000 | Ejzak et al. | 370/335 |
| 6,202,060 B1 | * | 3/2001 | Tran | 707/3 |
| 6,477,156 B1 | * | 11/2002 | AlaLaurila et al. | 370/331 |
| 6,487,657 B1 | * | 11/2002 | Brockmann | 713/154 |
| 6,497,656 B1 | * | 12/2002 | Evans et al. | 600/300 |
| 6,522,875 B1 | * | 2/2003 | Dowling et al. | 455/414 |
| 6,529,484 B1 | * | 3/2003 | Quinquis et al. | 370/310.1 |
| 6,629,151 B1 | * | 9/2003 | Bahl | 709/250 |
| 6,707,424 B1 | * | 3/2004 | Snyder et al. | 342/357.14 |

OTHER PUBLICATIONS

U.S. Appl No. 60/180,906, filed Feb. 2, 2000, Evans et al.*
ATM-Based TH-SSMA Network for Multimedia PCS, IEEE Journal on Selected Areas of Communications, vol. 17, No. 5, May 1999, Moe Z. Win.*

* cited by examiner

*Primary Examiner*—Steven Nguyen
*Assistant Examiner*—Roberta Shand
(74) *Attorney, Agent, or Firm*—Sprinkle IP Law Group (57) ABSTRACT

A virtual wireless local area network system and method utilizing impulse radio wherein transmission rates (bit rates) can vary according to the impulse radio transmission quality (signal to noise ratio) and wherein the position of the user can be determined and said user can be directed to an area of greater transmission rates and wherein a plurality of impulse radio portals can be utilized and switched between to maintain high levels of transmission rates while a user is moving within a predetermined area.

20 Claims, 8 Drawing Sheets

CORRESPONDING TO EACH Δt

IMPULSE RADIO VIRTUAL WIRELESS LOCAL AREA NETWORK SYSTEM AND METHOD

BACKGROUND OF THE INVENTION

1. Field of the Invention

The present invention relates generally to a virtual wireless local area network system and method. More particularly, the present invention provides a virtual wireless local area network system and method utilizing impulse radio.

2. Background of the Invention and Related Art

Mobile computing and communication has dramatically improved in recent years. Computers have become much smaller and battery life has improved enabling truly mobile computing and communications. This has come about because of the demand in place to be able to be mobile and yet have the same computing and communicating power as if one were located in one's office.

Further, the ability to share information among people and computers has spawned immense improvements in Local Area and Wide Area Networks. The greatest example of this is the Internet. People from all over the world now have the ability to communicate and share information throughout the world. Notwithstanding these improvements, truly mobile computing and communicating is still lacking. In an office building environment, if one desires to go from room to room it is very inconvenient to bring even the lightest computer with them. Further, even though docking stations with notebook computers enable users to "take their office with them" to a certain extent, it is still difficult to undock a notebook computer and reboot it up if you just are leaving the office for a short meeting in another office. Also, many times one would like to keep their office computer running and have a means of accessing it and it's computing power remotely. Having the ability to communicate with one's computer could also enable remote data processing, remote voice communication, remote email communication and any other voice or data functions presently available in a communication and computing environment.

Efforts have been made to create wireless local area networks, but with limited success. Traditional wireless communication means are subject to multipath problems as described below. Further, if one comes upon an area of very poor RF transmissive properties, it is impossible for them to know which way to move in order to go to an area of greater transmissive properties.

Thus there is a strong need in the mobile communication and computing industry for a system of method of wireless data transfer within a predetermined area and wherein the location and identity of the device can be ascertained thus enabling intelligent network connectivity.

SUMMARY OF THE INVENTION

The present invention provides a novel virtual wireless local area network that can automatically vary the data rate according to the propagation environment and requirements of the user.

It is a further object of the present invention to provide a novel virtual wireless local area network that can automatically vary the data rate according to the propagation environment and requirements of the user, to determine the position and identity of the user, and to thereby direct the user to an area of improved propagation characteristics when higher data rates are required.

It is another object of the present invention to provide a novel virtual wireless local area network that can automatically vary the data rate according to the propagation environment and requirements of the user, to determine the position and identity of the user, and to thereby allow the user to access their base computing and communication systems.

It is another object of the present invention to provide impulse radio portals throughout a predetermined area to allow wireless connectivity throughout said predetermined area; placing more impulse radio portals spaced more closely together if greater data rates are required and fewer impulse radio portals spaced farther apart if lower data rates will be needed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

Overview of the Invention

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Recent advances in communications technology have enabled an emerging, revolutionary ultra wideband technology (UWB) called impulse radio communications systems (hereinafter called impulse radio). To better understand the benefits of impulse radio to the present invention, the following review of impulse radio follows Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14, 1997), U.S. Pat. No. 5,687,169 (issued Nov. 11, 1997) and U.S. Pat. No. 5,832,035 (issued Nov. 3, 1998) to Fullerton et al.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed on Jun. 14, 1999 and both of which are assigned to the assignee of the present invention. All of the above patent documents are incorporated herein by reference.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

Figure 1A:
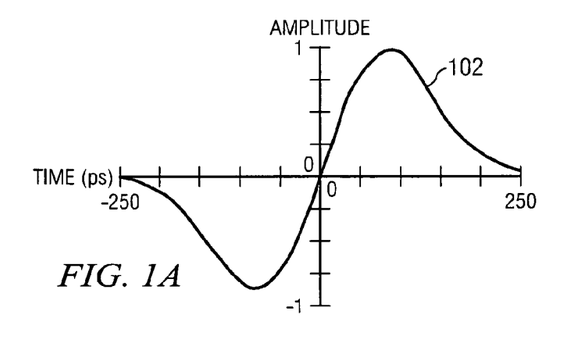
FIG. 1A illustrates a representative Gaussian Monocycle waveform in the time domain.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,

σ is a time scaling parameter, t is time, $f_{mono}(t)$ is the waveform voltage, and e is the natural logarithm base.

Figure 1B:
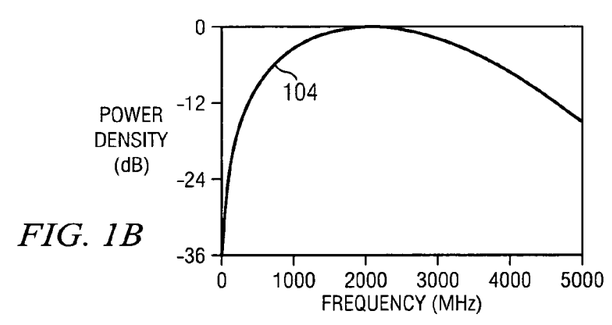
FIG. 1B illustrates the frequency domain amplitude of the Gaussian Monocycle of FIG. 1A.

The frequency domain spectrum of the above waveform is shown in FIG. 1B. The corresponding equation is:

$$F_{mono}(f) = (2\pi)^{\frac{3}{2}} \sigma f e^{-2(\pi \sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2A:
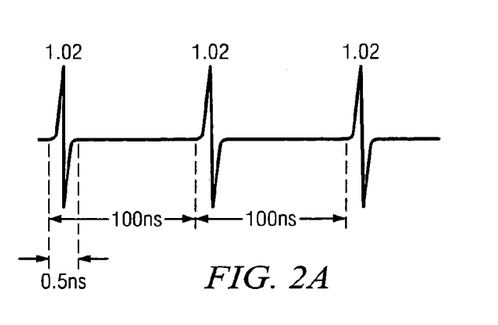
FIG. 2A illustrates a pulse train comprising pulses as in FIG. 1A.
Figure 2B:
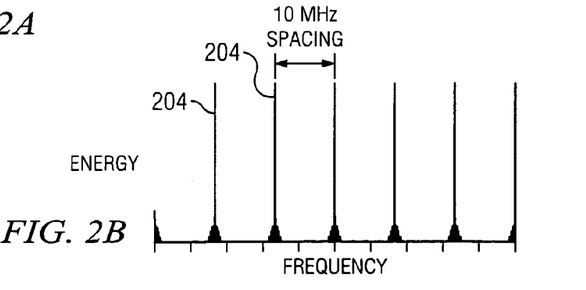
FIG. 2B illustrates the frequency domain amplitude of the waveform of FIG. 2A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHZ at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
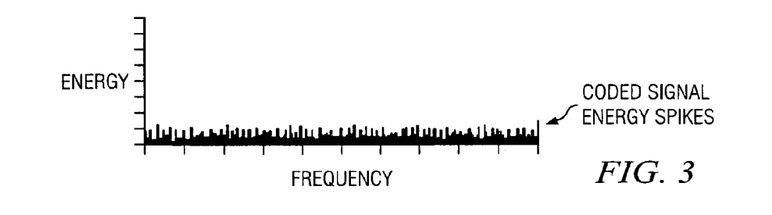
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
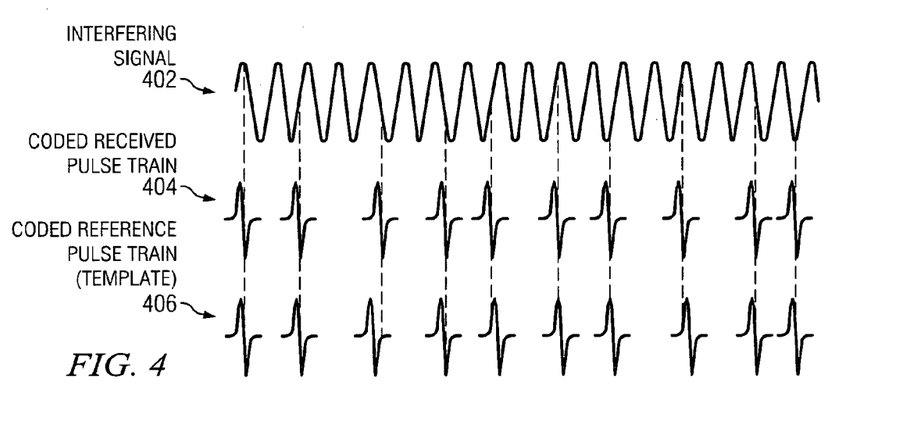
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHZ channel bandwidth yields a processing gain of 1000 or 30 dB. However, far greater processing gains are achieved with impulse radio systems, where for the same 10 KHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Figures 5A, 5B:
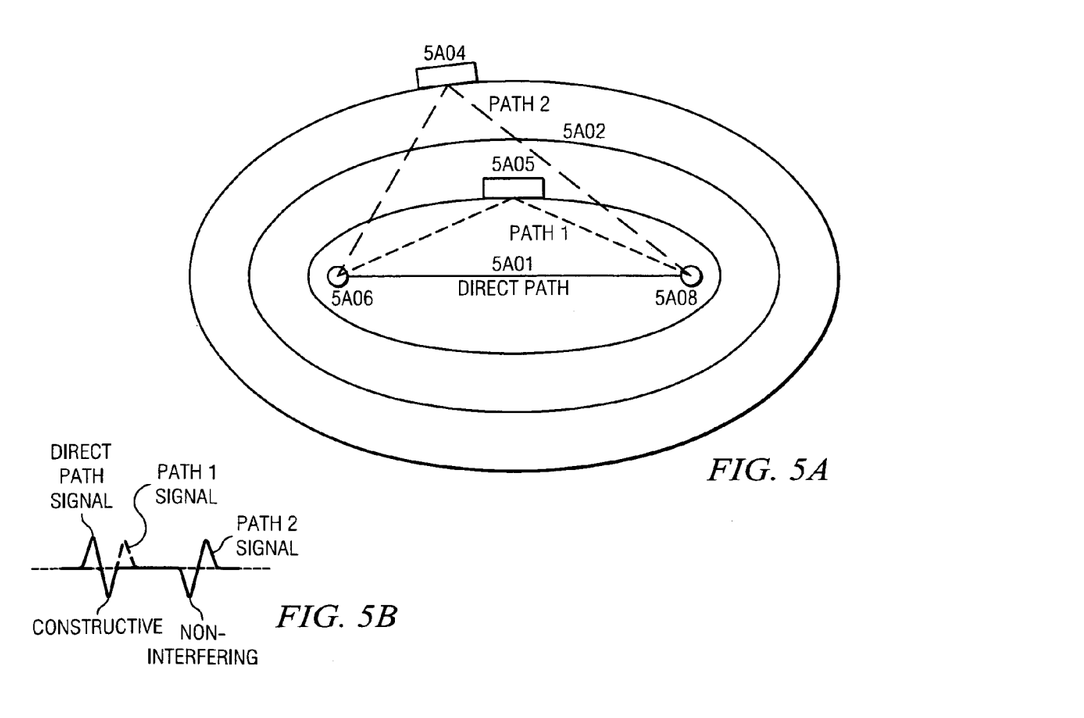
FIG. 5A illustrates a typical geometrical configuration giving rise to multipath received signals.
FIG. 5B illustrates exemplary multipath signals in the time domain.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band sysetms designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter TX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

Figure 5C:
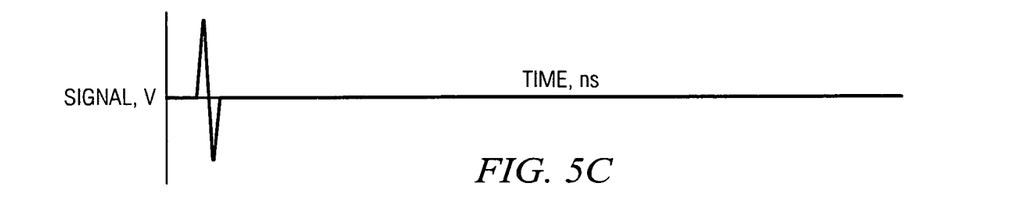
FIGS. 5C–5E illustrate a signal plot of various multipath environments.
Figure 5D:
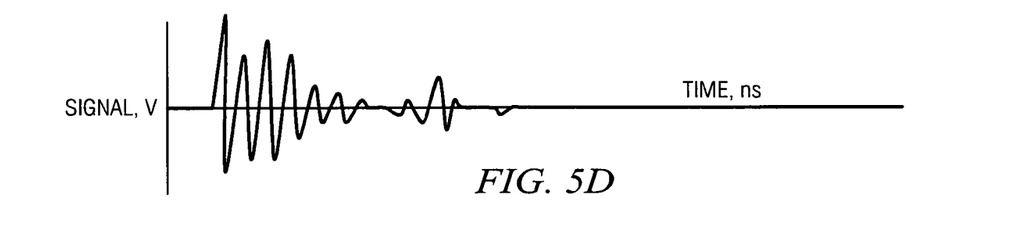
Figure 5E:
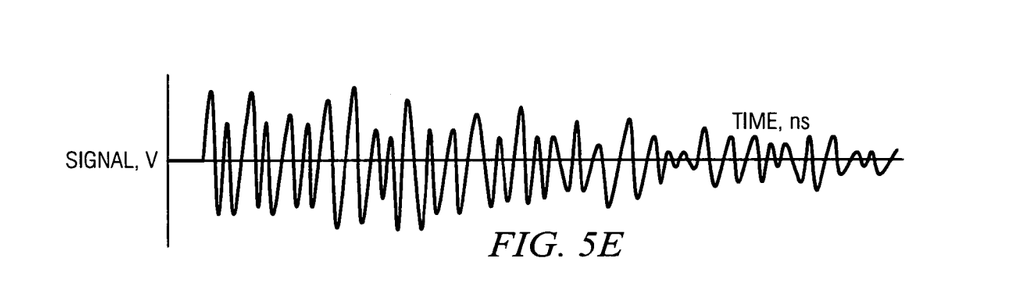

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of multipath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where r is the envelope amplitude of the combined multipath signals, and $2\sigma^2$ is the RMS power of the combined mulitpath signals.

Figure 5F:
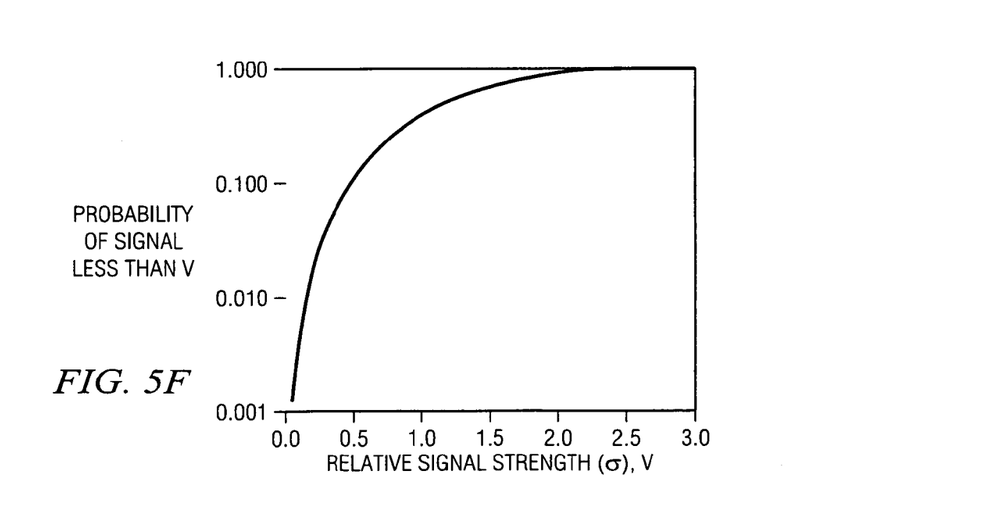
FIG. 5F illustrates the Rayleigh fading curve associated with non-impulse radio transmissions in a multipath environment.

This distribution shown in FIG. 5F. It can be seen in FIG. 5F that 10% of the time, the signal is more than 16 dB attenuated. This suggests that 16 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
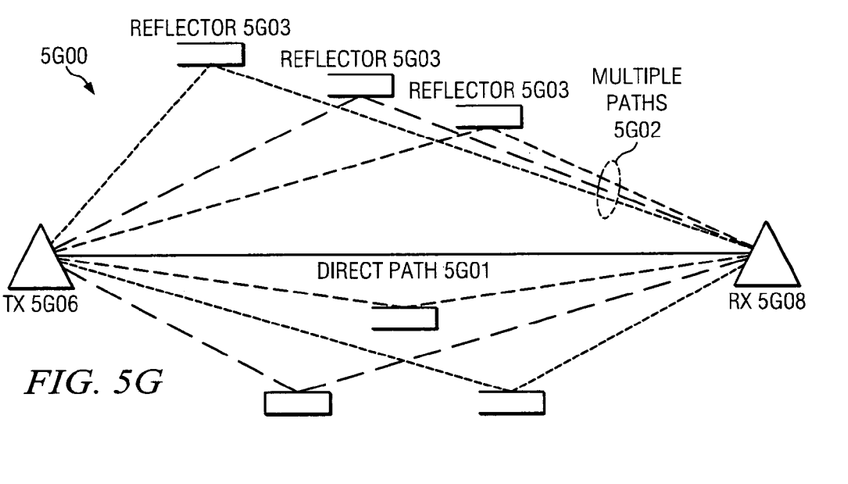
FIG. 5G illustrates a plurality of multipaths with a plurality of reflectors from a transmitter to a receiver.
Figure 5H:
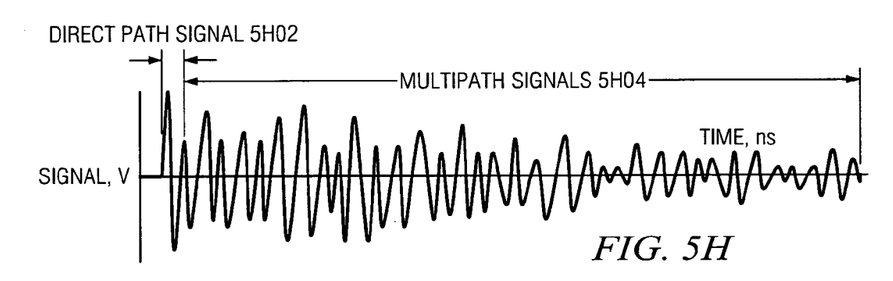
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02 with the vertical axis being the signal strength in volts and horizontal axis representing time in nanoseconds. Multipath signals are graphically illustrated at 5H04. Distance Measurement and Position Location Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending application Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned application Ser. No. 09/456,410, filed Dec. 8, 1999, titled, "System and Method for Monitoring Assets, Objects, People and Animals Utilizing Impulse Radio," and it's parent Ser. No. 09/407,106, filed Sep. 27, 1999, both of which are incorporated herein by reference.

Exemplary Transceiver Implementation

Transmitter

Figure 6:
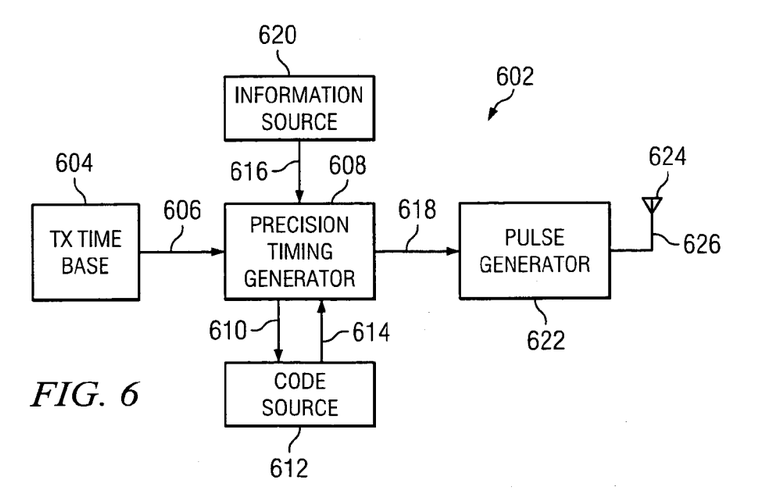
FIG. 6 illustrates a representative impulse radio transmitter functional diagram.

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618. The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

Figure 7:
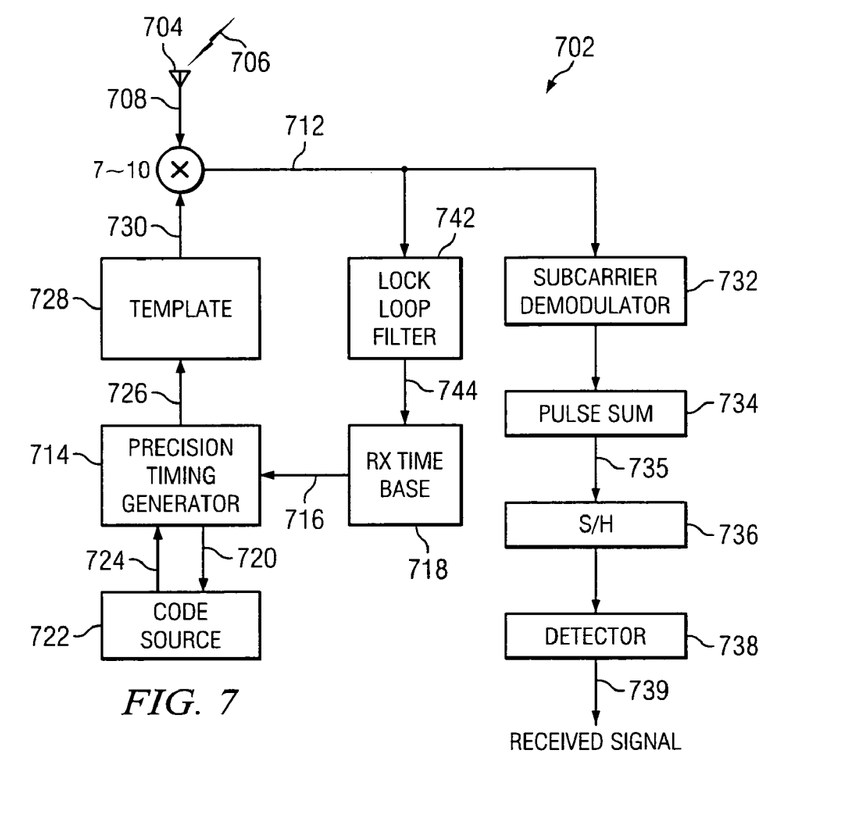
FIG. 7 illustrates a representative impulse radio receiver functional diagram.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This bandpass filtering will cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver (hereinafter called the receiver) for the impulse radio communication system is now described with reference to FIG. 7.

The receiver 702 comprises a receive antenna 704 for receiving a propagated impulse radio signal 706. A received signal 708 is input to a cross correlator or sampler 710 via a receiver transmission line, coupled to the receive antenna 704, and producing a baseband output 712.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter to generate the propagated signal. Thus, the timing of the template pulse train matches the timing of the received signal pulse train, allowing the received signal 708 to be synchronously sampled in the correlator 710. The correlator 710 ideally comprises a multiplier followed by a short term integrator to sum the multiplier product over the pulse interval.

The output of the correlator 710 is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator is then filtered or integrated in the pulse summation stage 734. A digital system embodiment is shown in FIG. 7. In this digital system, a sample and hold 736 samples the output 735 of the pulse summation stage 734 synchronously with the completion of the summation of a digital bit or symbol. The output of sample and hold 736 is then compared with a nominal zero (or reference) signal output in a detector stage 738 to determine an output signal 739 representing the digital state of the output voltage of sample and hold 736.

The baseband signal 712 is also input to a lowpass filter 742 (also referred to as lock loop filter 742). A control loop comprising the lowpass filter 742, time base 718, precision timing generator 714, template generator 728, and correlator 710 is used to generate an error signal 744. The error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
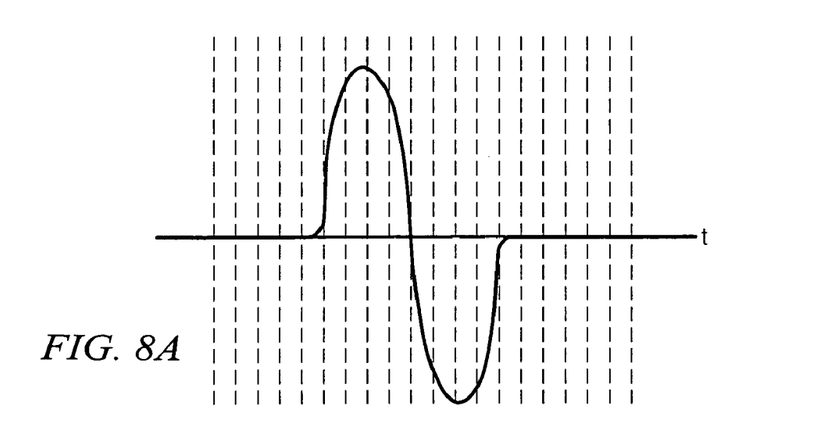
FIG. 8A illustrates a representative received pulse signal at the input to the correlator.
Figure 8B:
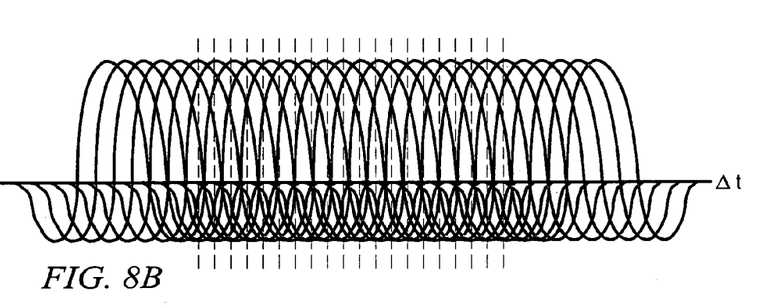
FIG. 8B illustrates a sequence of representative impulse signals in the correlation process.
Figure 9:
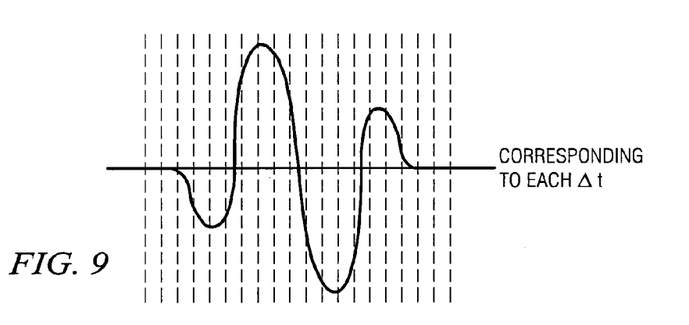
FIG. 9 illustrates the potential locus of results as a function of the various potential template time positions.

FIGS. 8–9 illustrate the cross correlation process and the correlation function. FIG. 8 shows the waveform of a template signal. FIG. 8B shows the waveform of a received impulse radio signal at a set of several possible time offsets. FIG. 9 represents the output of the correlator (multiplier and short time integrator) for each of the time offsets of FIG. 8B. Thus, this graph does not show a waveform that is a function of time, but rather a function of time-offset. For any given pulse received, there is only one corresponding point which is applicable on this graph. This is the point corresponding to the time offset of the template signal used to receive that pulse. Further examples and details of precision timing can be found described in U.S. Pat. No. 5,677,927, and commonly owned co-pending application Ser. No. 09/146,524, filed Sep. 3, 1998, titled "Precision Timing Generator System and Method", both of which are incorporated herein by reference.

Impulse Radio as Used in the Present Invention

As discussed above, when utilized in an impulse radio virtual wireless local area network of the present invention, the characteristics of impulse radio significantly improve the state of the art.

Figure 10:
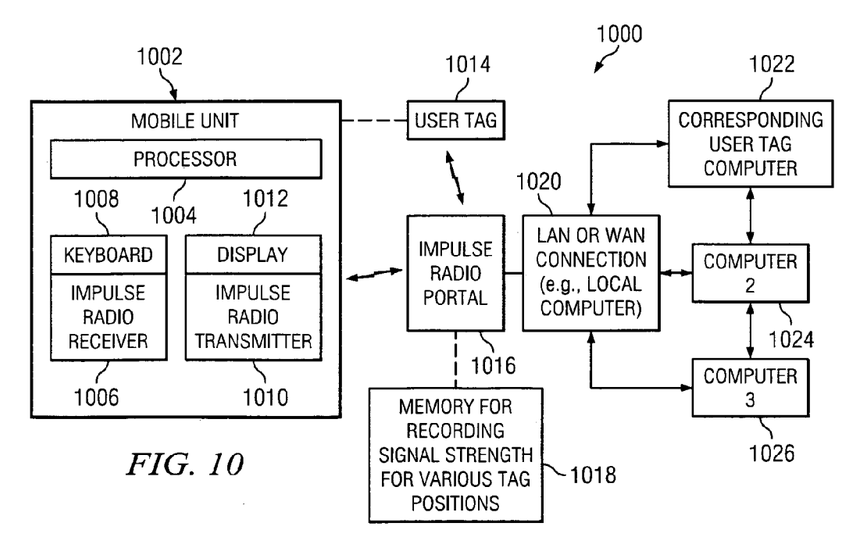
FIG. 10 is an illustration of one embodiment of the present invention wherein a mobile unit is connected wirelessly to an impulse radio portal which is interfaced with a Local Area Network (LAN) or Wide Area Network (WAN).

FIG. 10 illustrates the impulse radio virtual wireless local area network 1000 of the present invention. Mobile Unit 1002 can be any device desired to input information for transmission via impulse radio transmitter 1010 associated with mobile unit 1002. The information can be input into mobile unit 1002 via keyboard 1008, however, it is understood that information can be input via voice means such as a microphone or any other means now known or later developed. In order to display information that has been received by impulse radio receiver 1006 from impulse radio portal 1016, as well as displaying input information from keyboard 1008, a display 1012 can be associated with mobile unit 1002. Again, although a display is illustrated, any other data or voice relation means can be used such as an audio speaker associated with a mobile phone. The impulse radio portal is a term used to describe an impulse radio that contains an interface with a network and provides access to and communication with the network. Thus, the impulse portal couples the mobile unit to the neetwork. A processor 1004 can be incorporated into mobile unit 1002 to control the communication and data input and display functions. Because most data processing can be accomplished, via the wireless link between the mobile unit and the local area network via the impulse radio portal, at the users corresponding home computer, the processing power of processor 1004 can be trivial in relation to the processing power that would be required if all data processing would be accomplished at the mobile unit itself.

Associated with the individual using the mobile unit is a user tag 1014. The user tag 1014 communicates with the impulse radio portal and the mobile unit and provides positioning information of the user and the mobile unit and enables the network to know which user it is, thereby enabling connection with that users particular home computer, for example. Positioning can be accomplished as described above and as described by the impulse radio positioning patents that bave been incorporated herein by reference.

After determining the position of the mobile unit 1002 and associated tag 1014, the strength of the signal and the signal to noise ratio between the mobile unit and the impulse radio portal is measured within the impulse radio portal 1016. The signal strength and corresponding position are then stored in memory 1018. As illustrated above and in the impulse radio patents incorporated herein by reference, depending on the propagation characteristics of the environment, impulse radio systems can modify the data rate and improve the process gain by modifying the pulse integration parameters. Thus, if the mobile unit is in an area of excellent propagation characteristics (e.g., close to the impulse radio portal and without barriers to propagation) less processing gain is required and, as articulated above and in the corresponding impulse radio patents incorporated herein by reference, the data rate can be significantly increased.

While the mobile unit 1002 is in motion, the propagation characteristics will be constantly changing. Further, as the mobile unit 1002 is used for various activities, the data rate of the impulse radio transmission will vary significantly. For example, if the mobile unit is in voice mode and only voice communications are required within the network, only 64 kb/s data rate may be required. However, if the mobile unit is processing something complex that requires more computing power, higher data rates may be required. Also, with the proliferation of the Internet and other data networks, large bandwidth is required to transmit graphics and similar information.

The impulse radio portal constantly monitors the data throughput requirements of the mobile unit in relation to the propagation characteristics at the position of the mobile unit within the impulse radio portal area. If the propagation characteristics do not support the data rate required, the impulse radio portal will ascertain from its memory 1018 wherein in the impulse radio portal the propagation characteristics will support the data rate required and will suggest to the mobile unit 1002 with corresponding tag 1014 where to move in order to maintain the data rate requirements.

Impulse radio portal 1016 is interfaced with a gateway 1020 to a local or wide area network. This gateway can be a local computer 1020 or any other means known to those skilled in the art of accessing a networked structure. Once information is received by impulse radio portal 1016, access to the mobile unit user's corresponding computer 1022 is possible. Once this connection is made, the mobile unit would have remotely all of the functionality of his home computer as if he were located at the computer. Thus if the mobile unit is appropriately equipped, the user can answer telephone calls, access email, utilize the word processor or accomplish any computing and communicating task desired. Illustrated also in FIG. 10 is the other members of the network including other computers 1024 and 1026.

Figure 11:
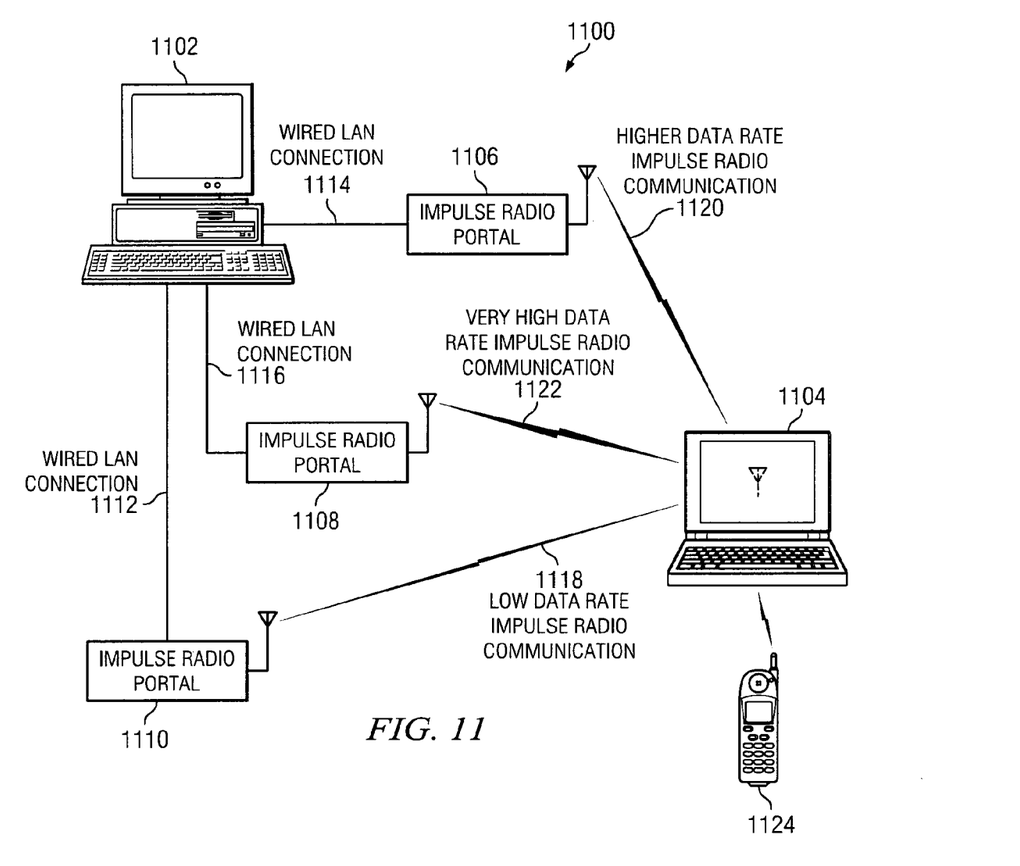
FIG. 11 illustrates one embodiment of an impulse radio portal which communicates wirelessly to a mobile unit and is interfaced to a WAN or LAN.

FIG. 11 at 1100 illustrates zones coveraged by plural impulse radio portals. As shown, mobile unit 1104 is in the zone closest to impulse radio portal 1108. Due to multipath effects caused by metal obstructions, various electromagnetic properties in a given area and other things that may effect propagation characteristics, it may not always be the case that the nearest impulse radio portal has the best data rate possibilities. However, for the sake of a general illustration it is depicted herein as such. Further, the impulse radio portal takes the above various propagation factors into consideration when determining data rate possibilities by storing in their memories historical positions of the mobile units and the data rates achieved. This information is constantly updated and can be initially stored in memory during the setup of the impulse radio predefined area by testing.

As shown as relative line thickness 1122, the mobile unit 1104 has the best data rate with impulse radio portal 1108. Although the mobile unit is also in communication with impulse radio portal 1106 (the second best data rate as depicted by moderate thickness line 1120) and impulse radio portal 1110 (the least data rate as depicted by thin line 1118), the data is entered into the network 1116 via impulse radio portal 1108 because the greatest data rate is achieved by this portal. The data entry impulse radio portal will be referred to as the primary portal.

As the mobile unit moves in relation to the predefined area defined by the impulse radio portals, it's position and signal strength are constantly monitored. Once the data has been transmitted to the impulse radio portal, the impulse radio portal interfaces with the network.

The impulse radio portal can, in effect, convert data received from an impulse radio to digital data and will format or packetize the data for transmission on the network, in accordance with known and future network protocols. The impulse radio portal will receive and demodulate into digital data impulse radio signals received from impulse radios. The digital data can be decoded before it is formatted for coupling to another impulse radio portal or other computing device over the network via the network protocol, or it can remain digitally coded and be coupled over the network via network protocol, only to be decoded by the target computing device or impulse radio portal. However, since analog-to-digital conversion (ADC), or digital-to-analog conversion (DAC), can occur in the impulse radios (e.g., transmitter, receiver or transceiver) as they are defined in the patents incorporated by reference, the interface (i.e., impulse radio portal) need not include ADC or DAC capability, but can merely pass digital information and/or packetize (i.e., format) it for transmission over the network according to a compatible network protocol.

The network can be the Internet, or simply an Ethernet, which is the most popular physical layer LAN technology in use today. Ethernet is popular because it strikes a good balance between speed, cost and ease of installation. These benefits, combined with wide acceptance in the computer marketplace and the ability to support virtually all popular network protocols, make Ethernet an ideal networking technology for most computer users today and an ideal interface with the impulse radio portal. The Institute for Electrical and Electronic Engineers (IEEE) defines the Ethernet standard as IEEE Standard 802.3. This standard defines rules for configuring an Ethernet network as well as specifying how elements in an Ethernet network interact with one another. By adhering to the IEEE standard, network equipment and network protocols can communicate efficiently and can be easily interfaced with impulse radio portals. Other LAN types include Token Ring, Fast Ethernet, Fiber Distributed Data Interface (FDDI), Asynchronous Transfer Mode (ATM) and LocalTalk, all of which can also be integrated into the impulse radio portal system by those with ordinary skill in the networking art.

As articulated above and in the referenced impulse radio patents and patent applications, extremely high data rates are possible. Rates that may surpass today's standard Ethernet networks. Thus, for Ethernet networks that need higher transmission speeds, the Fast Ethernet standard (IEEE 802.3u) has been established and can be integrated into the impulse radio virtual wireless LAN. This standard raises the Ethernet speed limit from 10 Megabits per second (Mbps) to 100 Mbps with only minimal changes to the existing cable structure. There are three types of Fast Ethernet: 100BASE-TX for use with level 5 UTP cable, 100BASE-FX for use with fiber-optic cable, and 100BASE-T4 which utilizes an extra two wires for use with level 3 UTP cable. The 100BASE-TX standard has become the most popular due to its close compatibility with the 10BASE-T Ethernet standard.

Those skilled in the art can modify the system depending on the number of users in each site on the network that need the higher throughput, decide which segments of the backbone need to be reconfigured specifically for 100BASE-T, and then choose the necessary hardware to connect the 100BASE-T segments with existing 10BASE-T segments. These are all networking configurations currently available and which can be interfaced with the impulse radio portals for the mobility herein described. The aforementioned networking embodiments are described for enabling and illustration purposes only and should not be construed as being limited to those networking embodiments. Indeed, it is anticipated that as Gigabit Ethernet, which is a future technology that promises a migration path beyond Fast Ethernet so the next generation of networks will support even higher data transfer speeds, is developed, impulse radio portals will be integrated with those architectures as well.

Token Ring is another form of network configuration which differs from Ethernet in that all messages are transferred in a unidirectional manner along the ring at all times. Data is transmitted in tokens, which are passed along the ring and viewed by each device. When a device sees a message addressed to it, that device copies the message and then marks that message as being read. As the message makes its way along the ring, it eventually gets back to the sender who now notes that the message was received by the intended device. The sender can then remove the message and free that token for use by others. Again, it is possible to integrate impulse radio portals into Token Ring embodiments by those skilled in the art.

Once the data has passed via impulse radio techniques to the impulse radio portal and interfaced with one of the networking configurations above, the mobile unit 1104 will have wireless access to the network and thereby its home computer 1102. Thus, all functions that can be accomplished while the user is at its computer 1102 can be accomplished by using mobile unit 1104. As illustrated, the mobile unit does not necessarily need to be a "dumb" terminal or a notebook computer, it could be a wireless communication means 1124 such as a impulse radio cordless communication device, a cellular communication device with impulse radio integration as described in the patent application incorporated herein by reference, an electronic organizer such as a palm pilot® developed by 3COMM or any other device that can interface with an impulse radio transceiver and communicate information.

Figure 12:
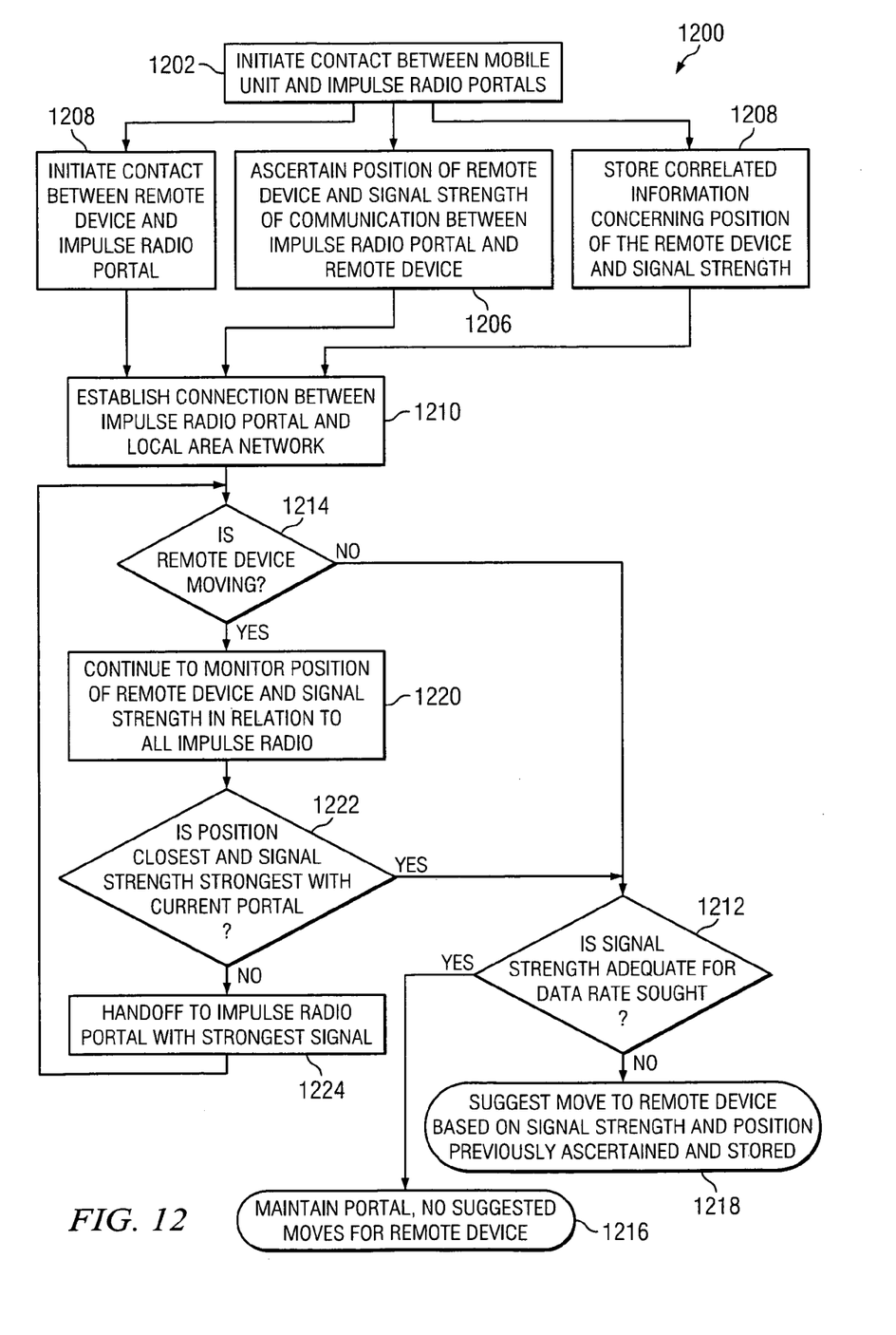
FIG. 12 is a flow chart illustrating the method of remote computing and communicating within a predetermined area covered by a plurality of impulse radio portals.

FIG. 12 illustrates the flow chart of the method of operation of the virtual wireless LAN of the present invention. In step 1202 a contact is initiated between the mobile unit and the impulse radio portals via impulse radio communications as described herein and by the impulse radio patents incorporated herein by reference. Once contact is initiated in step 1202, the impulse radio portal responds and establishes two-way communication. Because of the unique properties of impulse radio, simultaneously the position of the mobile unit can be ascertained. Further, as mentioned a TAG can be associated with a user. This TAG can have information concerning who the user is and which computer is his home computer. Other information also can be contained in the TAG as desired for various implementations of the present embodiment. Positioning using impulse radio is described above and in the patents and patent applications herein incorporated by reference. Once the positioning information has been obtained in step 1206, in step 1208 the correlated information concerning position of the mobile unit and signal strength relative to that position are stored in memory. Determining signal strength is articulated above and in the patents and patent applications incorporated herein by reference.

In step 1210 a connection is established between the primary impulse radio portal and the local area network. Although herein a local area network is described, it is understood that a wide area network or any network architecture (such as the Internet) is equally applicable for interface with the impulse radio portal. In step 1214 a determination as to whether or not the mobile unit is moving is made. If YES, then continue monitoring the position of the mobile unit and signal strength in relation to all impulse radio portals. In step, 1222, a determination is made if the signal strength is strongest with the current impulse radio portal. If NO, then a handoff is made to the impulse radio portal with the strongest signal (this is now the primary impulse radio portal) and a return to step 1214 is accomplished. If in step 1222, YES is determined and therefore the current impulse radio has the strongest signal, in step 1212 it is determined if the signal strength is adequate for the data rate sought. As described above and in the patents and patent applications incorporated herein by reference, signal strength and data rate are related in impulse radios. Hence, if a low signal strength and low signal to noise ratio are present, the integration of more pulses to retrieve a data bit would be required. Thereby, lowering the data rate. Thus, if YES in step 212, then the position with the current signal to noise ratio is adequate for the data rate required and no suggested position for the mobile unit is sent.

If, however, in step 1212 it is determined that the signal to noise ratio cannot support the data rate required, the impulse radio portal notes the present position of the mobile unit, updates the memory with the location and signal to noise ratio at that position and recalls from its memory a location near the present location wherein a better signal to noise ratio and therefore higher data rate is present. Any standard positioning scheme can be employed. For example, the impulse radio portal can have in its memory a data base of available positions or X-Y coordinates that can be related to the mobile unit. The message is related to the user in a meaningful way by simple software algorithms. This will prevent the user from being relocated to a position occupied by a wall or a desk or other obstruction.

Another positioning scheme which may be used is pre-designated computing areas. This provides more accuracy in signal to noise ratio and data rate information but limits movement flexibility. For example, mobile areas can be marked with designations. The user may be at position 123 in room XYZ wherein the data rate is 1 Mbit/sec and be downloading a graphic file wherein 5 Mbit/sec is desired. The impulse radio portal can suggest a move to position 345 in room XYZ or as an alternate position 456 in room ABC wherein because of multipath and distance considerations provides a higher data rate. Again, this information is constantly updated in the impulse radio signal to noise ration position memory.

While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements which embody the spirit and scope of the present invention, and including existing and future developed equivalents

What is claimed is:

1. An impulse radio wireless local area network computing and communication system, comprising:
   a data communication and computing network;
   at least one impulse radio portal, said impulse radio portal including a first ultra wideband impulse radio transceiver and an interface with said data communication and computer network; and
   a mobile unit, said mobile unit comprising:
      a data input;
      a data display;
      a processor; and
      a second ultra wideband impulse radio transceiver in communication with said first ultra wideband impulse radio transceiver at a data rate,
      wherein said mobile unit is a dumb terminal for relaying computation requests to a home computer via said impulse radio portal via said data communication and computing network and wherein said home computer communicates the results of said computation request to said dumb terminal via said data communication and computing network via said impulse radio portal, and
      wherein said first ultra wideband impulse radio transceiver and said second impulse radio transceiver are configured to vary said data rate based on a position of said mobile unit relative to said impulse radio portal determined using ultra wideband impulse radio positioning techniques.

2. An impulse radio wireless local area network computing and communication system, comprising:
   a data communication and computing network;
   at least one impulse radio portal, said impulse radio portal including a first ultra wideband impulse radio transceiver and an interface with said data communication and computer network; and
   a mobile unit, said mobile unit comprising:
      a voice input;
      a voice output; and
      a second ultra wideband impulse radio transceiver in communication with said first ultra wideband impulse radio transceiver at a data rate,
   wherein said mobile unit is a voice communicator for relaying voice information to a home computer via said impulse radio portal via said data communication and computing network and wherein said home computer communicates voice information from a third party source to said voice communicator via said data communication and computing network via said impulse radio portal, and
   wherein said first ultra wideband impulse radio transceiver and said second impulse radio transceiver are configured to vary said data rate based on a position of said mobile unit relative to said impulse radio portal determined using ultra wideband impulse radio positioning techniques.

3. An impulse radio wireless local area network computing and communication system, comprising:
   a data communication and computing network;
   at least one impulse radio portal, said impulse radio portal including a first ultra wideband impulse radio transceiver and an interface with said data communication and computer network;
   a mobile unit, said mobile unit comprising a second ultra wideband impulse radio transceiver in communication with said first ultra wideband impulse radio transceiver at a data rate; and
   a signal to noise measuring circuit to measure a signal to noise ratio of the signal between said first ultra wideband impulse radio transceiver and said second ultra wideband impulse radio transceiver.
   wherein said first ultra wideband impulse radio transceiver and said second impulse radio transceiver are configured to vary said data rate based on a position of said mobile unit relative to said impulse radio portal determined using ultra wideband impulse radio positioning techniques.

4. The impulse radio virtual wireless local area network computing and communication system of claim 3, further comprising a processing circuit to correlate said position of said mobile unit with said signal to noise ratio.

5. The impulse radio virtual wireless local area network computing and communication system of claim 3, further comprising a memory for storing said signal to noise ratio of said signal between said first ultra wideband impulse radio transceiver and said second ultra wideband impulse radio transceiver at a given location and for storing said position information of said mobile unit at the position where the signal to noise ratio was measured.

6. An impulse radio wireless local area network computing and communication system, comprising:

a data communication and computing network;

at least one impulse radio portal, said impulse radio portal including a first ultra wideband impulse radio transceiver and an interface with said data communication and computer network; and a mobile unit, said mobile unit comprising:
  a second ultra wideband impulse radio transceiver in communication with said first ultra wideband impulse radio transceiver at a data rate;
  a data input;
  a data display; and
  a processor, wherein said processor determines alternative position of said mobile unit to accommodate date rate requirements,
wherein said first ultra wideband impulse radio transceiver and said second impulse radio transceiver are configured to vary said data rate based on a position of said mobile unit relative to said impulse radio portal determined using ultra wideband impulse radio positioning techniques.

7. An impulse radio virtual wireless local area network computing and communication system, comprising:
a data communication and computing network;
a plurality of impulse radio portals, each of said impulse radio portals comprising an ultra wideband impulse radio transceiver and an interface with said data communication and computing network; and
a mobile unit, said mobile unit comprising an ultra wideband impulse radio transceiver in communication with at least one ultra wideband impulse radio transceiver associated with at least one impulse radio portal of said plurality of impulse radio portals at a data rate, wherein said mobile unit communicates with all of said plurality of impulse radio portals within said mobile unit's transmit range,
wherein said ultra wideband impulse radio transceiver associated with said mobile unit and said at least one ultra wideband impulse radio transceiver associated with said at least one impulse radio portal of said plurality of said impulse radio portals are configured to vary said data rate based on a position of said mobile unit relative to said at least one impulse radio portal determined using ultra wideband impulse radio positioning techniques,
wherein said mobile unit interfaces with the data communication and computing network through a primary portal, and
wherein said primary portal is the impulse radio portal of said plurality of impulse radio portals with the best signal to noise ratio.

8. An impulse radio virtual wireless local area network computing and communication system, comprising:
a data communication and computing network;
a plurality of impulse radio portals, each of said impulse radio portals comprising an ultra wideband impulse radio transceiver and an interface with said data communication and computing network; and
a mobile unit, said mobile unit comprising an ultra wideband impulse radio transceiver in communication with at least one ultra wideband impulse radio transceiver associated with at least one impulse radio portal of said plurality of impulse radio portals at a data rate, wherein said ultra wideband impulse radio transceiver associated with said mobile unit and said at least one ultra wideband impulse radio transceiver associated with said at least one impulse radio portal of said plurality of said impulse radio portals are configured to vary said data rate based on a position of said mobile unit relative to said at least one impulse radio portal determined using ultra wideband impulse radio positioning techniques, wherein said mobile unit communicates with all of said plurality of impulse radio portals within said mobile unit's transmit range,
wherein said mobile unit interfaces with the data communication and computing network through a primary portal, and
wherein said primary portal switches to the impulse radio portal with the best signal to noise ratio as said mobile unit varies its position throughout impulse radio portals.

9. A method of impulse radio wireless local area network computing and communicating, comprising the steps of:
interfacing an impulse radio portal into a data communication and computing network, said impulse radio portal including a first ultra wideband impulse radio transceiver;
establishing communication between said impulse radio portal and a mobile unit, said mobile unit including a second ultra wideband impulse radio transceiver at a data rate, wherein said first ultra wideband impulse radio transceiver and said second ultra wideband impulse radio transceiver are configured to vary said data rate based on a position of said mobile unit relative to said impulse radio portal determined using ultra wideband impulse radio positioning techniques; and
measuring the signal to noise ratio of said communication between said impulse radio portal and said mobile unit.

10. The method of impulse radio virtual wireless local area network computing and communicating of claim 9, further comprising the step of storing said signal to noise measurements in said impulse radio portal.

11. A method of impulse radio wireless local area network computing and communicating, comprising the steps of:
interfacing an impulse radio portal into a data communication and computing network, said impulse radio portal including a first ultra wideband impulse radio transceiver;
establishing communication between said impulse radio portal and a mobile unit, said mobile unit including a second ultra wideband impulse radio transceiver at a data rate, wherein said first ultra wideband impulse radio transceiver and said second ultra wideband impulse radio transceiver are configured to vary said data rate based on a position of said mobile unit relative to said impulse radio portal determined using ultra wideband impulse radio positioning techniques;
interfacing a plurality of impulse radio portals to said data communication and computing network, wherein said plurality of impulse radio portals cover a pre-determined area wherein data communication and computing will be accomplished; and
measuring the signal to noise radio of said communications.

12. The method of impulse radio virtual wireless local area network computing and communicating of claim 11, further comprising the step of designating a primary portal for data transfer as the impulse radio portal with the best signal to noise ratio.

13. The method of impulse radio virtual wireless local area network computing and communicating of claim 12, further comprising correlating the signal to noise ratio of the communication between said mobile unit and said primary portal to said position.

14. The method of impulse radio virtual wireless local area network computing and communicating of claim 13, further comprising the step of storing said correlated signal to noise ratio and said position into said plurality of impulse radio portals.

15. The method of impulse radio virtual wireless local area network computing and communicating of claim 14, further comprising the step of suggesting to said mobile unit new positions wherein better signal to noise ratios have been ascertained.

16. The method of impulse radio virtual wireless local area network computing and communicating of claim 14, further comprising the step of designating a new primary portal based on a best signal to noise ratios of the signal to noise ratios of communications between said mobile unit and said plurality of impulse radio portals and switching primary portal status to said impulse radio portal with said best signal to noise ratio.

17. The method of impulse radio virtual wireless local area network computing and communicating of claim 16, wherein said switching occurs automatically.

18. The method of impulse radio virtual wireless local area network computing and communicating of claim 16, wherein said switching occurs by notifying a user of said mobile unit of a better signal to noise ratio of another impulse radio portal of said plurality of impulse radio portals and allowing manual switching to said another impulse radio portal.

19. An impulse radio system comprising an ultra wideband impulse radio transmitting circuit and an ultra wideband impulse radio receiving circuit, wherein:

said impulse radio system includes a circuit for selectively varying transmission bit rates from said ultra wideband impulse radio transmitting circuit according to the quality of the impulse radio transmission and a position of said ultra wideband impulse radio receiving circuit relative to said ultra wideband impulse radio transmitting circuit determined by impulse radio positioning techniques, and said impulse radio system includes a circuit that directs a user of said impulse radio system to an alternative position ascertained to support greater transmission bit rates.

20. A method of impulse radio virtual wireless local area network computing and communicating, comprising the steps of:

interfacing an impulse radio into a data communication and computing network, said impulse radio comprising a first ultra wideband impulse radio transceiver;

establishing communication between said impulse radio and a mobile radio unit, said mobile unit including a second ultra wideband impulse radio transceiver at a date rate, wherein said first ultra wideband impulse radio transceiver and said second impulse radio transceiver are configured to vary said data rate based on a position of said mobile radio unit relative to said impulse radio determined using ultra wideband impulse radio positioning techniques; and directing a user of said mobile unit to an alternative position determined to be conducive to greater transmission bit rates.

* * * * *